United States Patent [19]
Sugiyama

[11] Patent Number: 5,896,721
[45] Date of Patent: Apr. 27, 1999

[54] METAL DEVICE FOR JOINING WOODEN MEMBERS IN WOODEN BUILDING

[75] Inventor: Kazuo Sugiyama, Hiroshima, Japan

[73] Assignee: West Company Limited, Hiroshima, Japan

[21] Appl. No.: 08/965,849

[22] Filed: Nov. 7, 1997

[30] Foreign Application Priority Data

Nov. 19, 1996 [JP] Japan .................................. 8-324707

[51] Int. Cl.[6] .................................................. E04B 1/38
[52] U.S. Cl. .............................. 52/712; 52/702; 52/698; 52/656.9; 403/232.1; 403/246
[58] Field of Search .............................. 52/712, 702, 703, 52/726.2, 736.2, 236.3, 656.9, 655.1, 737.2, 698, 721.2; 403/246, 230, 232.1, 188, 292, 294, 304

[56] References Cited

U.S. PATENT DOCUMENTS

| | | |
|---|---|---|
| 65,970 | 6/1867 | Wardwell . |
| 832,133 | 10/1906 | Lanz . |
| 1,245,537 | 11/1917 | Van Fleet . |
| 2,106,084 | 1/1938 | Coddington . |
| 3,429,092 | 2/1969 | Perry et al. . |
| 3,817,005 | 6/1974 | Rannefeld ............... 51/702 X |
| 3,820,293 | 6/1974 | Ohe et al. . |
| 4,068,332 | 1/1978 | Ball et al. . |
| 4,261,155 | 4/1981 | Gilb . |
| 4,558,968 | 12/1985 | Meickl . |
| 5,044,137 | 9/1991 | Shigeru et al. . |
| 5,062,733 | 11/1991 | Cholid et al. ............. 403/246 X |
| 5,242,239 | 9/1993 | Hosokawa . |
| 5,253,945 | 10/1993 | Hosokawa . |
| 5,284,311 | 2/1994 | Baer . |
| 5,295,754 | 3/1994 | Kato . |
| 5,342,138 | 8/1994 | Saito et al. ............. 403/246 X |
| 5,438,811 | 8/1995 | Goya . |
| 5,469,678 | 11/1995 | Zamerovsky . |
| 5,577,856 | 11/1996 | Tezuka ................. 52/702 X |
| 5,727,358 | 3/1998 | Hayashi et al. . |

FOREIGN PATENT DOCUMENTS

| | | | |
|---|---|---|---|
| 2647861 | 12/1990 | France ................. 52/712 |
| 619216 | 3/1961 | Italy ................... 403/230 |

*Primary Examiner*—Carl D. Friedman
*Assistant Examiner*—Winnie Yip
*Attorney, Agent, or Firm*—Flynn, Thiel, Boutell & Tanis, P.C.

[57] ABSTRACT

A main body, composed of a pair of L-shaped metal plates combined with each other in a back-to-back positional relation, is secured to a first wooden member with a U-shaped stopper by bolts and nuts. A second wooden member is secured with the first wooden member as a vertical slit made at the edge portion thereof receives the combined metal plates secured to the first wooden member, and joint bars are firmly inserted into holes and openings made through the second wooden member and the combined metals accordingly.

6 Claims, 5 Drawing Sheets

METAL DEVICE FOR JOINING WOODEN MEMBERS IN WOODEN BUILDING

BACKGROUND OF THE INVENTION

Field of the Invention

The present invention relates to an improved metal device for joining a wooden member, e.g., a post, with another wooden member, e.g., a beam, in a wooden building.

A conventional device for joining wooden member, e.g., a post, with another member such as a beam and/or a girth have lacked reliability. It is because a joint operation of wooden members through use of the conventional device is troublesome. It is also because each post is subjected to have a large notch or cut in order to receive a beam or a girth.

SUMMARY OF THE INVENTION

In view of the foregoing, an object of the present invention is to provide a metal device for joining a wooden member with another wooden member in a wooden building, which is more reliable and makes construction of a wooden building easier compared to the conventional device.

According to a first aspect of the present invention, there is provided a metal device for joining wooden members in a wooden building, which comprises a main body, a plurality of U-shaped stoppers, tightening bolts and joint bars.

The main body is composed of a pair of L-shaped metal plates combined with each other in a back-to-back positional relation. Each L-shaped metal plate has a base portion and a flange portion. Each base portion protrudes from each flange portion at an obtuse angle when it is in an unfastened position. The obtuse angle means an angle wider than a right angle. The obtuse angle between the base portion and the flange portion is forced to become right angle when the main body is fastened to a wooden member. Each base portion is provided with a turn-over edge at the outer edge. The combined base portions, i.e. the combination of two base portions, have openings for bolts on the center line thereof. The combined flange portions, i.e. the combination of two flange portions positioned in back-to-back relation, are provided with windows, each of which corresponds to the opening for bolt. The combined base portions are also provided with openings adjacent to the upper and lower edges thereof. Each turn-over edge has hollows.

The plurality of U-shaped stoppers are such that each U-shaped stopper passes through the corresponding window while leg portions thereof are fit in the corresponding hollow. So, each U-shaped stopper is positioned by the base portion. Each U-shaped stopper comprises an opening for bolt at the center thereof. Each leg portion is longer than that of the turn-over edge.

The plurality of tightening bolts are arranged such that each of same passes through both the corresponding opening for bolt of the U-shaped stopper and the opening for bolt of the base portions of the metal plates. Each bolt is then engaged with a nut, securing a combination of the L-shaped metal plates and the U-shaped stopper to a first wooden member.

The plurality of joint bars are such that each pin is tightly inserted into a corresponding transverse hole of a second wooden member and subsequently the opening of the flange portions. Prior to this process, each flange portion is inserted into a corresponding vertical slit at the edge portion of each second wooden member, and each bolt head or a nut is situated in a corresponding vertical groove at the edge surface of the second wooden member.

In this first aspect of the present invention, there is provided a metal device for joining wooden members in a wooden building, which comprises a supporter at a lower window the combined flange portions. The supporter is composed of a reversed-U shape portion and a pair of wings. The wings support a second wooden member from its bottom when the second wooden member is joined with a first wooden member.

According to a second aspect of the present invention, there is provided a metal device for joining wooden members in a wooden building, which further comprises notches at the top and bottom edges of the combined flange portions. One of the notches is placed right above the upper opening, and the other right below the lower opening of the combined flange portions.

According to a third aspect of the present invention, there is provided a metal device for joining wooden members in a wooden building, which comprises notches in place of the openings of the combined flange portions. An opening is made in between the notches.

According to the present invention, each L-shaped metal plate comprises a flange portion and a base portion, and each base portion protrudes from a corresponding flange portion at an obtuse angle when it is in an unfastened position. Therefore, when a main body, which is a combination of two L-shaped metal plates, is secured to a first wooden member with tightening bolts, the combination of the base portions is bent and pressed against the first wooden member while both side edges thereof are supported by the first wooden member. Further, the height of each leg portion of each U-shaped stopper is arranged longer than that of each turn-over edge, so that the U-shaped stopper acts like a washer and after a tightening bolt is engaged with a nut, prevents the bolt from becoming loose.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENT

An embodiment of the present invention will now be described in detail referring to FIGS. 1 to 8.

A metal device for joining wooden members in a wooden building according to the present invention comprises a main body, a plurality of U-shaped stoppers 40, tightening bolts 17 and joint bars 63.

The main body is composed of a pair of L-shaped metal plates 21 combined with each other in a back-to-back positional relation. Each L-shaped metal plate 21 has a base portion 11 and a flange portion 12. Each base portion 11 protrudes from a corresponding flange portion 12 at an obtuse angle Y when it is in an unfastened position. The obtuse angle Y is an angle wider than a right angle. The obtuse angle Y between the base portion 11 and the flange portion 12 if forced to become right angle when the main body is fastened to a wooden member 50, a post standing vertically in a wooden building. Each base portion 11 is provided with a turn-over edge 22 at the outer edge thereof. The combined base portions 11 have two openings 13 for bolts on the center line thereof. The combined flange portions 12 are provided with two windows 14, each of which corresponds to the opening 13. The combined flange portions 12 are also provided with two openings 16, one adjacent to the upper edge and the other lower edge thereof. Each turn-over edge 22 has two hollows 15.

The plurality of U-shaped stoppers 40 are such that each U-shaped stopper 40 passes through the corresponding window 14 while leg portions 42 thereof are fit in the corresponding hollow 15. Due to this combination, each U-shaped stopper 40 is suitably positioned by the base portion 11. Each U-shaped stopper 40 comprises an opening 41 for bolt at the center thereof. The length H of each leg portion 42 is longer than the length T of the turn-over edge 22.

The plurality of tightening bolts 17 are arranged such that each passes through the corresponding bolt opening 41 of the U-shaped stopper 40 and the bolt opening 13 of the base portions 11 of the metal plates 21. Due to this arrangement, each tightening bolt 17 is passed through a corresponding hole 51 of a first wooden member 50 and it is engaged with a nut provided at the other side of the first wooden member 50.

Figure 1:
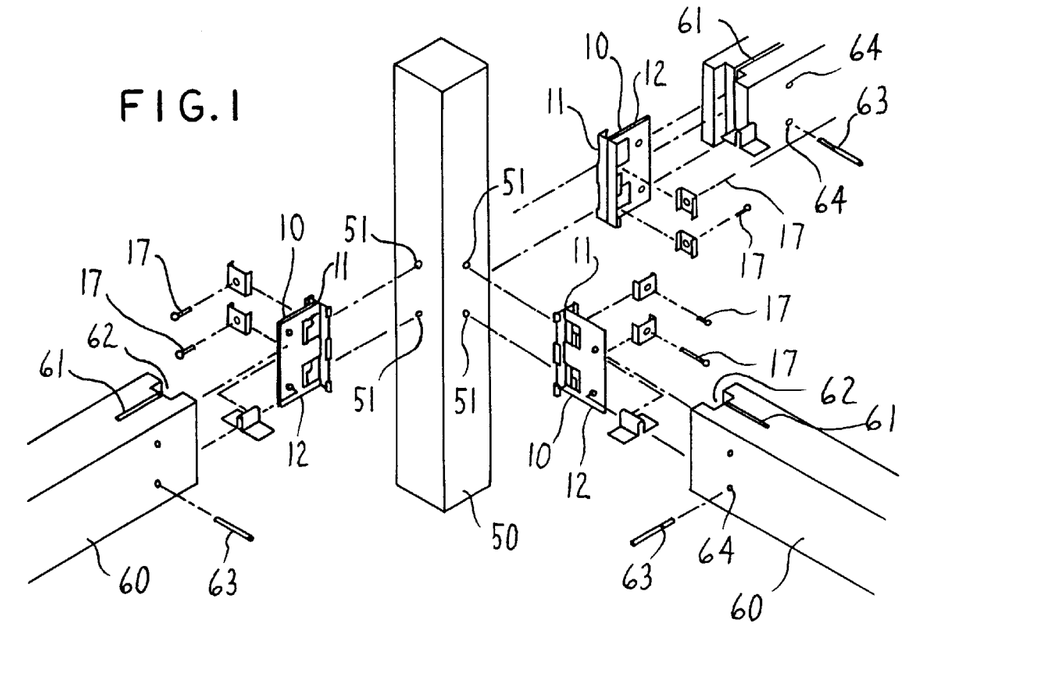
FIG. 1 is a schematic exploded perspective view showing a metal device for joining wooden members in a wooden building according to a first aspect of the present invention with wooden members nearby.
Figure 2:
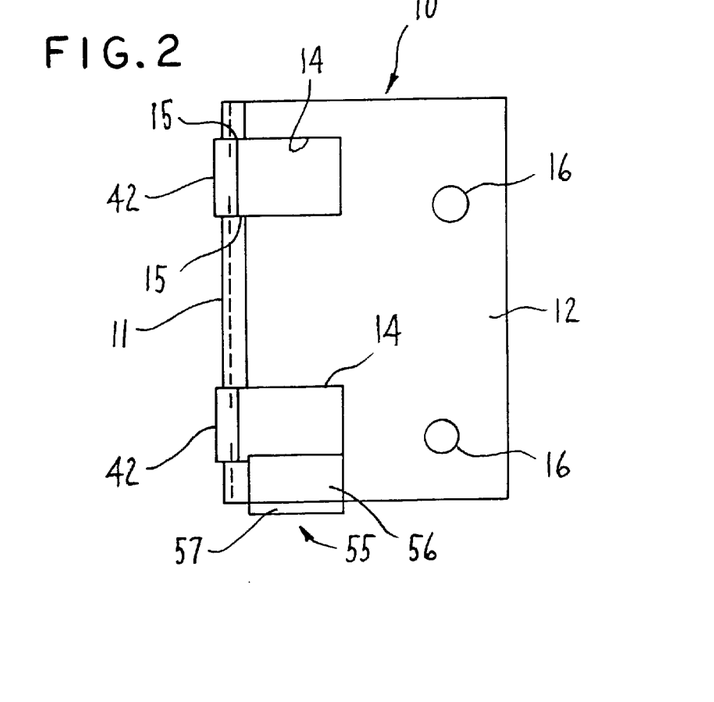
FIG. 2 is a side view of a metal device for joining wooden members in a wooden building according to a first aspect of the present invention.
Figure 3:
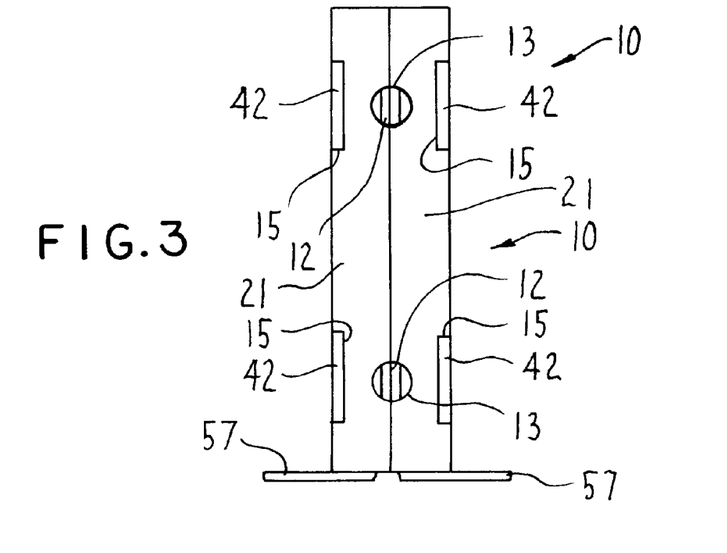
FIG. 3 is a rear elevation of a metal device for joining wooden members in a wooden building according to a first aspect of the present invention.
Figure 4:
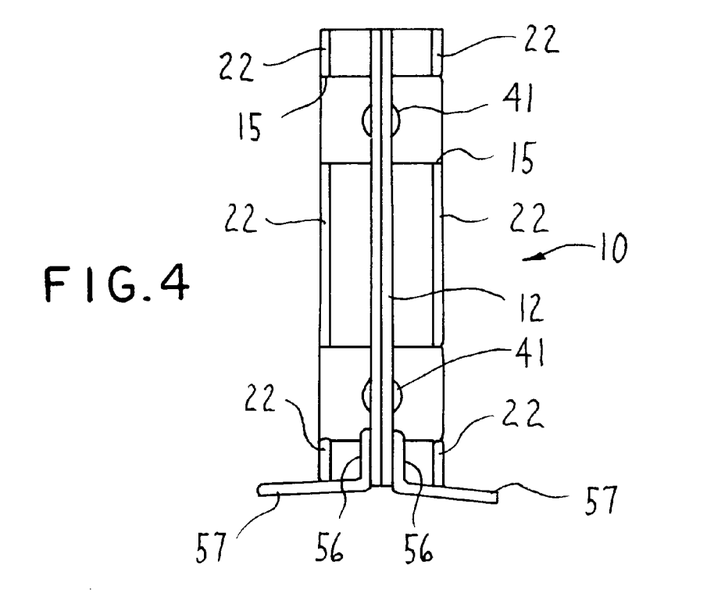
FIG. 4 is a front elevation of a metal device for joining wooden members in a wooden building according to a first aspect of the present invention.
Figure 5:
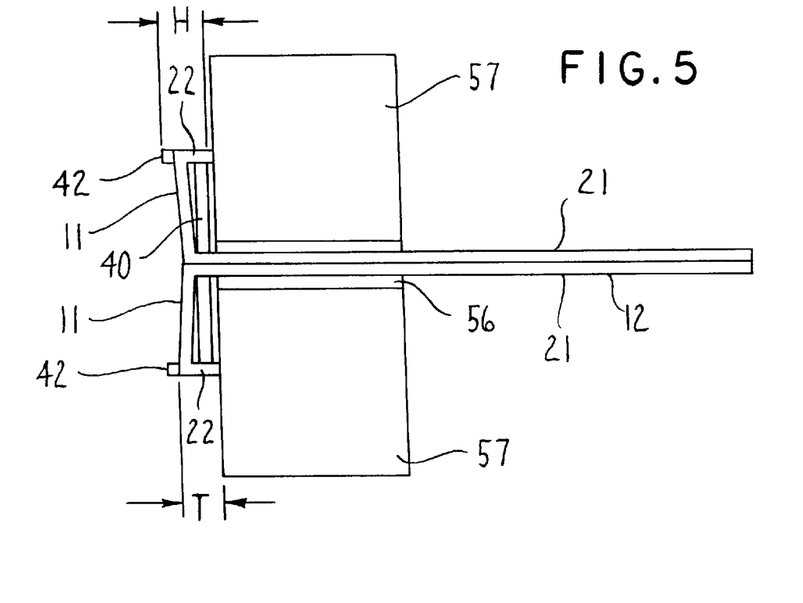
FIG. 5 is a top view of a metal device for joining wooden members in a wooden building according to a first aspect of the present invention.
Figure 6:
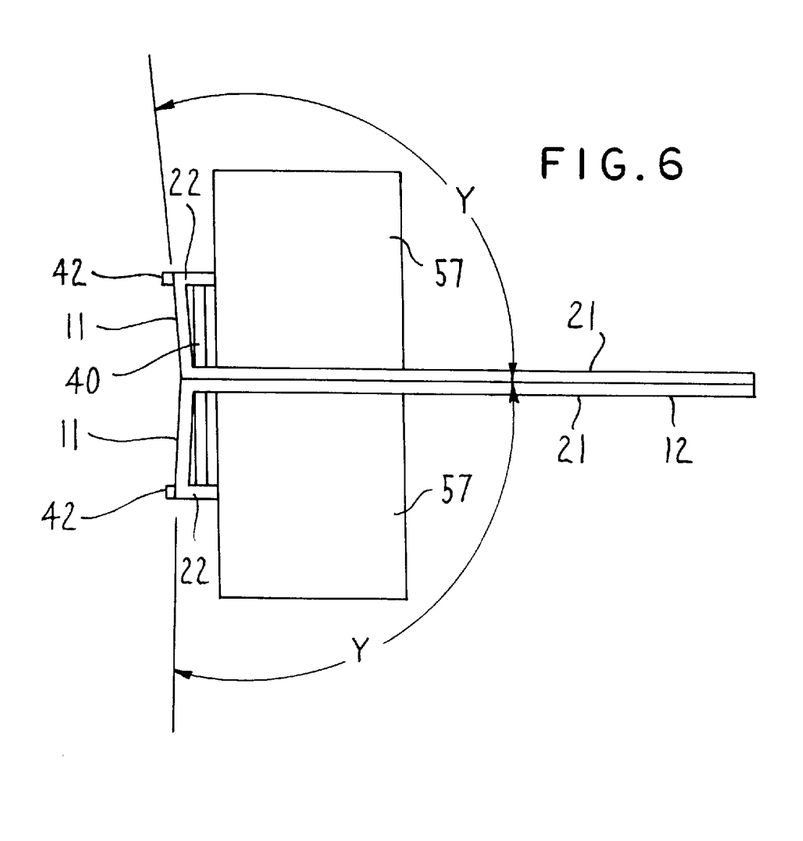
FIG. 6 is a bottom view of a metal device for joining wooden members in a wooden building according to a first aspect of the present invention.
Figure 7:
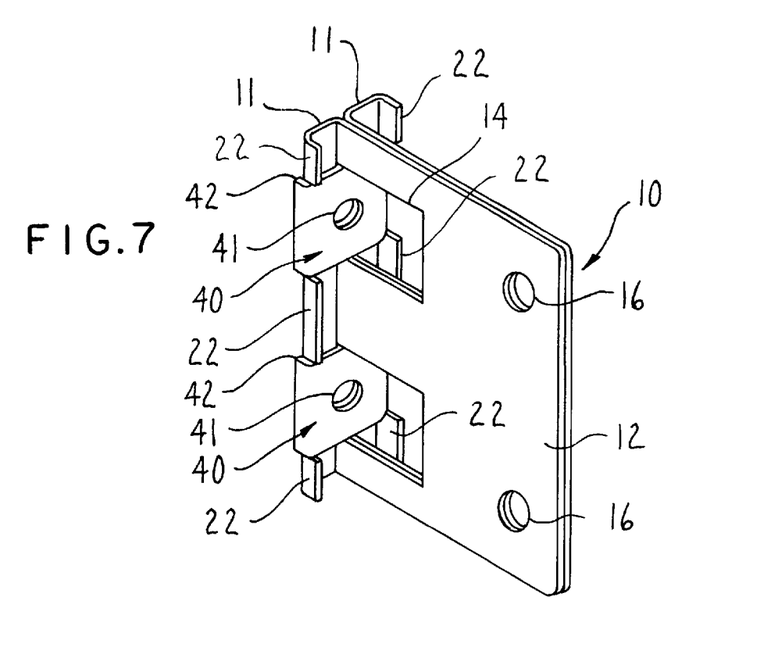
FIG. 7 is a perspective view of a metal device for joining wooden members in a wooden building according to a first aspect of the present invention wherein a supporter is removed therefrom.

Although it is illustrated in FIG. 1 that each bolt 17 is to be inserted into a corresponding hole 51 of the first wooden member 50, each bolt 17 may be inserted from the opposite side of the hole 51, placing a nut in a window 14 and a groove 62 in place of the head of the bolt 17.

The plurality of joint bars elongate fasteners, or pins 63 are such that each of the pins 63 is tightly inserted into a corresponding transverse hole 64 of a second wooden member 60, e.g., a beam, and subsequently the opening 16 of the flange portions 12. Prior to this operation, each flange portion 12 is inserted into a corresponding vertical slit 61 provided at the edge portion of each second wooden member 60, and each head of each bolt 17 or a nut engaging with the bolt 17 is situated in a corresponding vertical groove 62 formed at the edge surface of the second wooden member 60. Each joint bar 63 may be made of a pin or a bolt.

Each bolt 17 is passed through a corresponding opening 41 of the U-shaped stopper 40, an opening 13 of the combined base portions 11 and subsequently a hole 51 of the first wooden member 50. Each bolt 17 is then engaged with a nut, securing a combination of the stopper 40 and the main body of the device to the first wooden member 50.

After the combination of the stopper 40 and the main body of the device is secured to the first wooden member 50, the second wooden member 60 is positioned by the first wooden member 50 such that the vertical slit 61 receives the combined flange portions 12, and accordingly, the groove 62 receives the heads of bolts 17 or nuts. Upon completion of this operation, the joint bar 63 is inserted into a transverse hole 63 of the second wooden member 60 and an opening 16 made through the combined flange portions 12, firmly securing the second wooden member 60 with the first wooden member 50.

Figure 8:
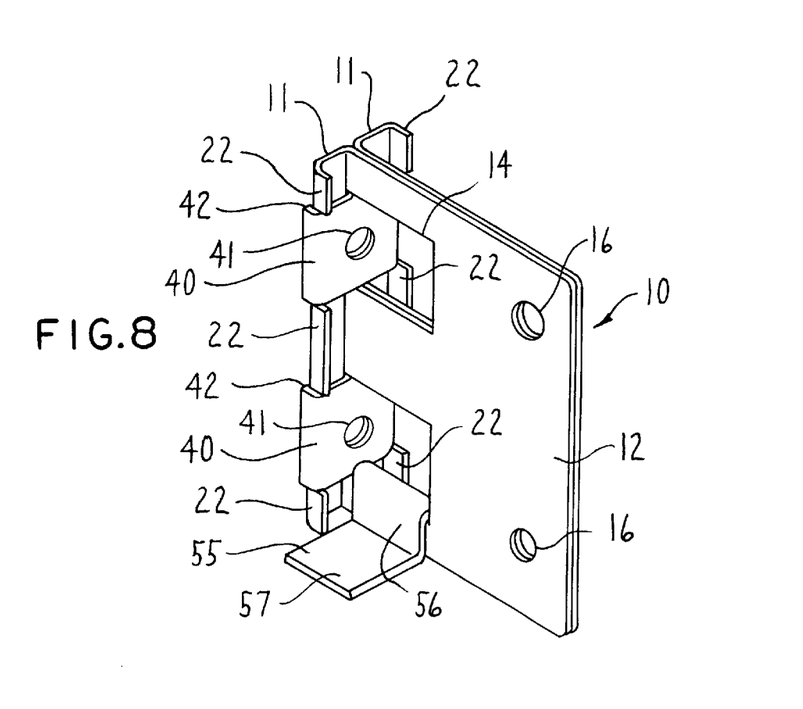
FIG. 8 is a perspective view of a metal device for joining wooden members in a wooden building according to a first aspect of the present invention.

This device may preferably be provided with a supporter 55 as illustrated in FIG. 8. The supporter 55 is composed of a reversed-U shape portion 56 and a pair of wings 57, each of which projects from the corresponding edge of the reversed-U shape portion 56. The supporter 55 is positioned at the lower window 14 of the combined flange portions 12 such that the reversed-U shape portion 56 rides on the bottom edge of the lower window 14 while both wings 57 extend from the portion 56 in the transverse directions. The wings 57 support a second wooden member 60 from its bottom when the second wooden member 60 is joined with a first wooden member 50. With this embodiment, an joint operation of wooden members becomes easier.

Another embodiment of the present invention will be described in detail referring to FIG. 9. This metal device 10 comprises notches 18 at the top and bottom edges of the combined flange portions 12. One of the notches 18 is placed right above the upper opening 16, and the other one 18 right below the lower opening 16 of the combined flange portions 12. Through use of this embodiment, a joint bar 63 can be inserted into an upper transverse hole 64 of a second wooden member 60 before the second wooden member 60 is adjusted to the metal device 10 by placing the combined the flange portions 12 in the vertical slit 61. When the second wooden member 60 is adjusted to the metal device 10 which is secured to the first wooden member 50, the second wooden member 60 can be supported by the joint bar 63 as the joint bar 63 is placed in the notch 18. Subsequently, another joint bar 63 is inserted into the lower transverse hole 64 and the lower opening 16 of the combined flange portions 12. Therefore, this embodiment makes a joint operation of wooden members easier.

Figure 9:
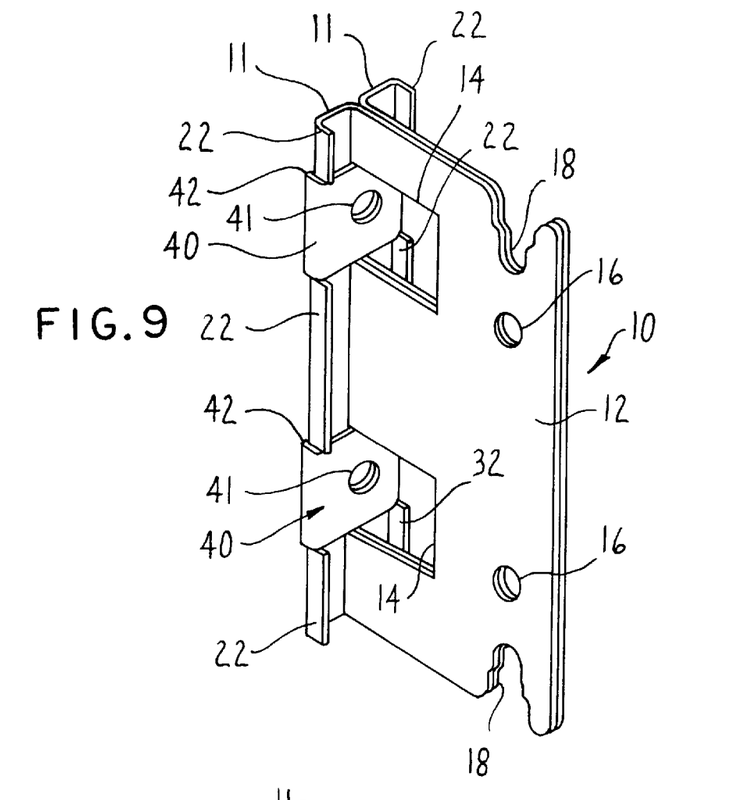
FIG. 9 is a perspective view of a metal device for joining wooden members in a wooden building according to a second aspect of the present invention.

Further, through use of the device shown in FIG. 9, two separate second wooden members 60 can be joined in parallel with each other with a first wooden member as illustrated in FIG. 1 by, for example, positioning a device in a normal position for the second wooden member 60 on the left, while positioning another device in an upside down position for the second wooden member 60 on the right. Since the width between the upper edge of the combined flange portions 12 and the upper edge of the upper window 14 is narrower than the width between the lower edge of the combined flange portions 12 and the lower edge of the lower window 14, holes 51 for the left member 60 and the right member 60 made through the first wooden member 50 do not interfere with each other. Therefore, each bolt 17 for the left member 60 and the right member 60 can be engaged with a corresponding nut.

Figure 10:
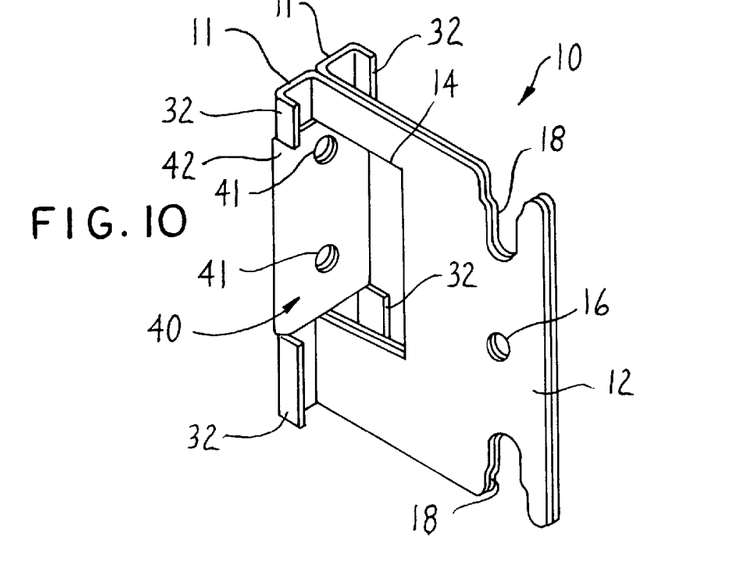
FIG. 10 is a perspective view of a metal device for joining wooden members in a wooden building according to a third aspect of the present invention.

Still, another embodiment of the present invention will be described hereinafter referring to FIG. 10. This metal device 10 comprises notches 18 in place of the openings 16 at a combination of the flange portions 12. An opening 16 is made in between the notches 18. This metal device 10 can be used both in normal and upside down positions, so that an joint operation of wooden members with this embodiment becomes easier. Further, like the device as illustrated in FIG. 9, this device can also allow two separate second wooden members 60 to join the first wooden member 50 in a parallel position. Joint bars 63 may be inserted into an upper notch 18 and a lower notch 18, instead of the upper notch 18 and an opening 16.

According to the above-described embodiments of the present invention, it should be noted that each L-shaped metal plate 21 comprises a flange portion 12 and a base portion 11, and each base portion 11 protrudes from a corresponding flange portion 12 at an obtuse angle Y when it is in an unfastened position. Therefore, when a main body, which is a combination of two L-shaped metal plates 21, is secured to a first wooden member 50 with tightening bolts 17, the combined base portions 11 are bent and pressed against the first wooden member 50 while both side edges thereof are supported by the first wooden member 50. Further, the height H of each leg portion 42 of each U-shaped stopper 40 is longer than height T of each turn-over edge 22, so that the U-shaped stopper 40 acts like a washer after a tightening bolt 17 is secured to a first wooden member 50, preventing the bolt 17 from becoming loose. Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A metal device for joining wooden members in a wooden building comprising:

a main body composed of a pair of L-shaped metal plates combined with each other in back-to-back positional relation and defining a center line along said main body, each L-shaped metal plate having a base portion and a flange portion, each base portion protruding from each flange portion at an obtuse angle in an unfastened position and a right angle in a fastened position, each base portion having a turn-over edge at an outer edge thereof, the combined base portions together defining openings for bolts along the center line of the main body, the combined flange portions together defining windows corresponding to the openings of the combined base portions, the combined flange portions also together defining openings adjacent to upper and lower edges thereof, each turn-over edge defining hollows therein;

a plurality of U-shaped stoppers each passing through a corresponding window and having leg portions engaged in corresponding hollows so as to be positioned by the combined base portions, each U-shaped stopper having an opening in the center thereof, each leg portion being longer than the turn-over edges of the combined L-shaped metal plates;

a plurality of bolts each passing through a corresponding opening of the U-shaped stopper and a corresponding opening of the combined base portions of the metal plates for engagement within a corresponding hole of a first wooden member; and a plurality of elongate fasteners, each being adapted to be tightly inserted into a corresponding hole of a second wooden member and a corresponding opening of the combined flange portions, the combined flange portions being adapted to be inserted into a corresponding vertical slit at an edge portion of the second wooden member, and each bolt head or nut associated with each of the bolts being adapted to be situated in a corresponding vertical groove at an edge surface of the second wooden member.

2. A metal device for joining wooden members in a wooden building claimed in claim 1, wherein a supporter is positioned through a lower one of said windows of the combined flange portions, the supporter having a reversed U-shaped body and wings, each wing projecting from a corresponding edge of the reversed U-shaped body in the transverse direction so as to support a bottom of the second wooden member.

3. A metal device for joining wooden members in a wooden building comprising:

a main body composed of a pair of L-shaped metal plates combined with each other in back-to-back positional relation and defining a center line along said main body, each L-shaped metal plate having a base portion and a flange portion, each base portion protruding from each flange portion at an obtuse angle in an unfastened position and a right angle in a fastened position, each base portion having a turn-over edge at an outer edge thereof, the combined base portions together defining openings for bolts along the center line of the main body, the combined flange portions together defining windows corresponding to the openings of the combined base portions, the combined flange portions together defining openings adjacent to upper and lower edges thereof, the combined flange portions together defining an outer notch at the upper edge above an upper one of the openings thereof and a lower notch at the lower edge below a lower one of the openings thereof, each turn-over edge defining hollows therein;

a plurality of U-shaped stoppers each passing through a corresponding window and having leg portions engaged in corresponding hollows so as to be positioned by the combined base portions, each U-shaped stopper having an opening in the center thereof, each leg portion being longer than the turn-over edges of the combined L-shaped metal plates;

a plurality of bolts each passing through a corresponding opening of the U-shaped stopper and a corresponding opening of the combined base portions of the metal plates for engagement within a corresponding hole of a first wooden member; and a plurality of elongate fasteners, one of which is adapted to be tightly inserted into the upper notch and another of which is adapted to be tightly inserted into a corresponding hole of a second wooden member and a corresponding opening of the combined flange portions, the combined flange portions being adapted to be inserted into a corresponding vertical slit at an edge portion of the second wooden member, and each bolt head or nut associated with each of the bolts being adapted to be situated in a corresponding vertical groove at an edge surface of the second wooden member.

4. A metal device for joining wooden members in a wooden building claimed in claim 3, wherein a supporter is positioned through a lower one of said windows of the combined flange portions, the supporter having a reversed U-shaped body and wings, each wing projecting from a corresponding edge of the reversed U-shaped body in the transverse direction so as to support a bottom of the second wooden member.

5. A metal device for joining wooden members in a wooden building comprising:

a main body composed of a pair of L-shaped metal plates combined with each other in back-to-back positional relation and defining a center line along said main body, each L-shaped metal plate having a base portion and a flange portion, each base portion protruding from each flange portion at an obtuse angle in an unfastened position and a right angle in a fastened position, each base portion having a turn-over edge at an outer edge thereof, the combined base portions together defining openings for bolts along the center line of the main body, the combined flange portions together defining windows corresponding to the openings of the combined base portions, the combined flange portions together defining upper and lower notches at upper and lower edges thereof, the combined flange portions also defining an opening between the upper and lower notches, each turn-over edge defining hollows therein;

a plurality of U-shaped stoppers each passing through a corresponding window and having leg portions engaged in corresponding hollows so as to be positioned by the combined base portions, each U-shaped stopper having an opening in the center thereof, each leg portion being longer than the turn-over edges of the combined L-shaped metal plates;

a plurality of bolts each passing through a corresponding opening of the U-shaped stopper and a corresponding opening of the combined base portions of the metal plates for engagement within a corresponding hole of a first wooden member; and a plurality of elongate fasteners, one of which is adapted to be tightly inserted into a corresponding hole of a second wooden member and the upper notch of the combined flange portions, and another of which is adapted to be tightly inserted into a corresponding hole of the second wooden member and the opening of the combined flange portions, the combined flange portions being adapted to be inserted into a corresponding vertical slit at an edge portion of the second wooden member, and each bolt head or nut associated with each of the bolts being adapted to be situated in a corresponding vertical groove at an edge surface of the second wooden member.

6. A metal device for joining wooden members in a wooden building claimed in claim 5, wherein a supporter is positioned through a lower one of said windows of the combined flange portions, the supporter having a reversed U-shaped body and wings, each wing projecting from a corresponding edge of the reversed U-shaped body in the transverse direction so as to support a bottom of the second wooden member.

* * * * *

UNITED STATES PATENT AND TRADEMARK OFFICE
CERTIFICATE OF CORRECTION

PATENT NO. :  5 896 721
DATED      :  April 27, 1999
INVENTOR(S) : Kazuo SUGIYAMA It is certified that error appears in the above-identified patent and that said Letters Patent is hereby corrected as shown below:

Column 6, line 32; change "outer" to "upper".

Signed and Sealed this

Twenty-eighth Day of December, 1999

Attest:

Q. TODD DICKINSON

Attesting Officer        Acting Commissioner of Patents and Trademarks